United States Patent
Delaney et al.

(10) Patent No.: US 10,503,443 B2
(45) Date of Patent: Dec. 10, 2019

(54) SYSTEMS AND METHODS FOR ALLOCATING DATA COMPRESSION ACTIVITIES IN A STORAGE SYSTEM

(71) Applicant: NetApp, Inc., Sunnyvale, CA (US)

(72) Inventors: William P. Delaney, Wichita, KS (US);
Keith Moyer, Wichita, KS (US);
Randolph Sterns, Boulder, CO (US);
Joseph Blount, Wichita, KS (US);
Charles Binford, Wichita, KS (US);
Joseph Moore, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 237 days.

(21) Appl. No.: 15/497,816

(22) Filed: Apr. 26, 2017

(65) Prior Publication Data
US 2018/0074723 A1 Mar. 15, 2018

Related U.S. Application Data

(60) Provisional application No. 62/394,005, filed on Sep. 13, 2016.

(51) Int. Cl.
*G06F 3/06* (2006.01)

(52) U.S. Cl.
CPC .............. *G06F 3/067* (2013.01); *G06F 3/061* (2013.01); *G06F 3/0608* (2013.01); *G06F 3/0652* (2013.01); *G06F 3/0659* (2013.01)

(58) Field of Classification Search
CPC ........ G06F 3/067; G06F 3/0659; G06F 3/061; G06F 3/0608; G06F 3/0652
See application file for complete search history.

(56) References Cited

U.S. PATENT DOCUMENTS

| | | | | |
|---|---|---|---|---|
| 5,287,420 A | * | 2/1994 | Barrett | H04N 19/186 375/240.01 |
| 6,523,102 B1 | * | 2/2003 | Dye | G06F 12/023 709/247 |
| 6,920,154 B1 | * | 7/2005 | Achler | H04L 63/0457 370/350 |
| 7,020,160 B1 | * | 3/2006 | Achler | H03M 7/30 370/466 |
| 7,129,860 B2 | * | 10/2006 | Alvarez, II | H03M 7/30 341/51 |

(Continued)

*Primary Examiner* — Christopher D Birkhimer
(74) *Attorney, Agent, or Firm* — Haynes and Boone, LLP

(57) ABSTRACT

A method, a computing device, and a non-transitory machine-readable medium for allocating data compression activities in a storage system are provided. A method includes tracking, by a storage controller, computing resources corresponding to a storage server. The storage controller processes one or more host read requests to access data requested by one or more hosts, the processing of the one or more host read requests including decompressing the data requested by the one or more hosts from the storage server and providing the decompressed data to the one or more hosts. The storage controller determines an amount of available computing resources after processing the one or more host read requests. Based on the amount of available computing resources, the storage controller performs inline compression of a first portion of host write requests and background compression of a second portion of the host write requests.

20 Claims, 3 Drawing Sheets

(56) References Cited

U.S. PATENT DOCUMENTS

| | | | | |
|---|---|---|---|---|
| 7,180,909 | B1* | 2/2007 | Achler | H03M 7/3084 |
| | | | | 370/466 |
| 7,200,859 | B1* | 4/2007 | Perlman | H04N 19/61 |
| | | | | 375/240.01 |
| RE43,558 | E* | 7/2012 | Achler | H03M 7/30 |
| | | | | 370/466 |
| 8,504,725 | B2* | 8/2013 | Achler | H03M 7/3088 |
| | | | | 709/203 |
| 8,639,849 | B2* | 1/2014 | Achler | H03M 7/3088 |
| | | | | 370/229 |
| 9,176,858 | B2* | 11/2015 | Jin | G06F 3/0608 |
| 2007/0016694 | A1* | 1/2007 | Achler | H03M 7/30 |
| | | | | 709/247 |
| 2010/0077141 | A1* | 3/2010 | Achler | H03M 7/30 |
| | | | | 711/108 |
| 2010/0250774 | A1* | 9/2010 | Delpuch | H04N 5/76 |
| | | | | 709/231 |
| 2014/0143517 | A1* | 5/2014 | Jin | G06F 3/0608 |
| | | | | 711/171 |
| 2016/0011816 | A1* | 1/2016 | Aizman | G06F 3/0604 |
| | | | | 711/117 |
| 2016/0246812 | A1* | 8/2016 | Barajas Gonzalez | |
| | | | | G06F 3/0641 |
| 2016/0249033 | A9* | 8/2016 | Delpuch | H04N 5/76 |

* cited by examiner

SYSTEMS AND METHODS FOR
ALLOCATING DATA COMPRESSION
ACTIVITIES IN A STORAGE SYSTEM

CROSS-REFERENCE TO RELATED APPLICATIONS

This application claims priority to U.S. Provisional Application No. 62/394,005, filed on Sep. 13, 2016, which is incorporated herein by reference in its entirety.

TECHNICAL FIELD

The present description relates to data storage systems, and more specifically, to systems and methods for data compression in a data storage system.

BRIEF DESCRIPTION OF THE DRAWINGS

The present disclosure is best understood from the following detailed description when read with the accompanying figures.

DETAILED DESCRIPTION

Figure 1:
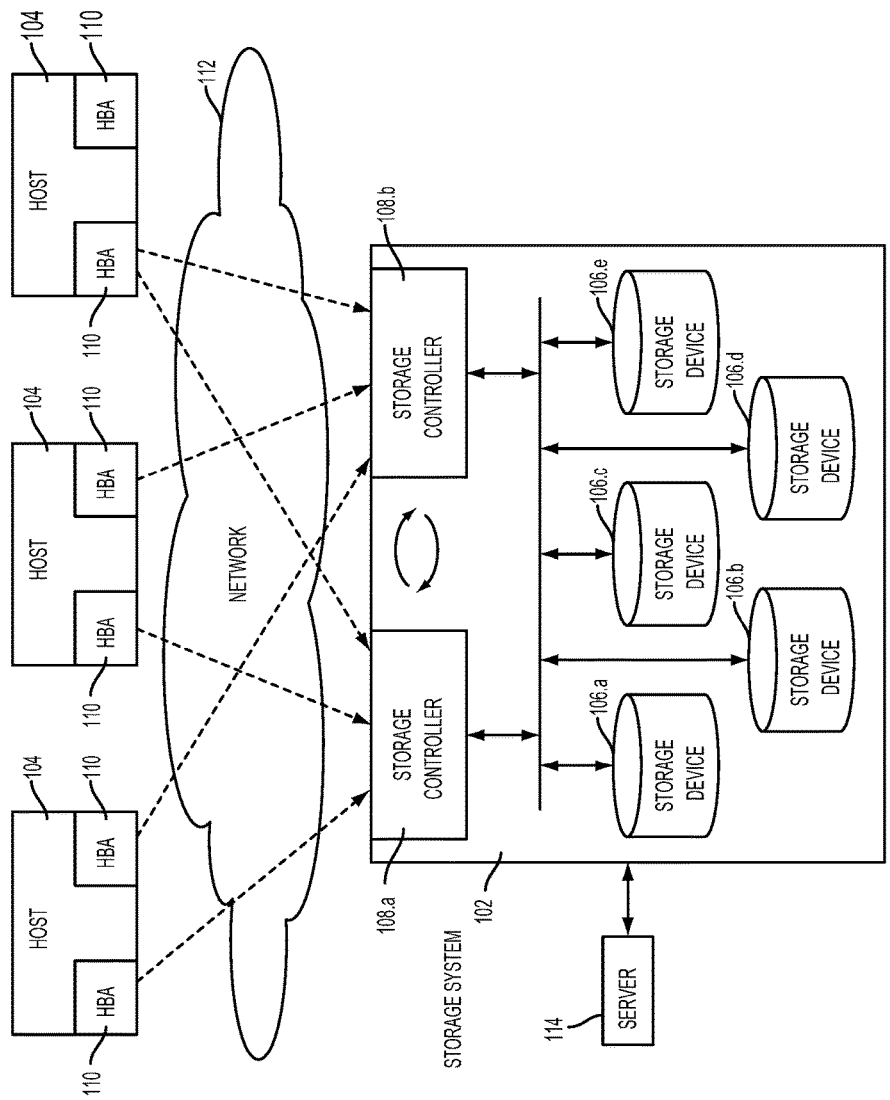
FIG. 1 is an organizational diagram of an exemplary data storage architecture according to aspects of the present disclosure.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

Various embodiments include systems, methods, and machine-readable media for allocating computing resources on a storage server based on system load metrics. As described herein, data received from host computers may be compressed and stored in the memory of a storage server. A storage controller of the storage server allocates computing resources to processing host read requests to decompress data requested by the hosts and provide the decompressed data to the hosts. It is recognized that computing devices offer limited resources and there may be times when there are insufficient computing resources available to handle all computing tasks concurrently. Accordingly, the present disclosure describes a priority-based allocation technique for allocating the remaining available computing resources to garbage collection and compressing data received in host write requests.

In more detail, the storage controller may switch between inline processing and background processing of host write requests based on the amount of remaining computing resources. For example, during times of heavy load, the storage controller may perform background compression of data received in host write requests to store the data in an non-compressed format and perform compression of the data when there are resources available. During times of non-heavy load, the storage controller may use inline processing of the host write requests to compress the received data and store the data in a compressed format in a first pass. With respect to garbage collection tasks, the storage controller may prioritize garbage collection corresponding to older and/or infrequently modified data over performing garbage collection on new and/or frequently modified data. Moreover, garbage collection tasks and host write requests are provided priorities relative to one another based on metrics such as age of the data and/or expected frequency of modification of the data.

The prioritization scheme is described in further detail in the following disclosure. The allocation of computing tasks based on the prioritization scheme offers useful improvements to tailor the computing tasks performed to the amount of computing resources that are available. Accordingly, the embodiments described herein provide advantages to computing efficiency and allow the use of the computing resources to be maximized to provide the greatest benefit.

FIG. 1 illustrates a data storage architecture 100 in which various examples may be implemented. Specifically, and as explained in more detail below, one or both of the storage controllers 108.a and 108.b read and execute computer readable code to perform the methods described further herein to determine available computing resources and allocate the determined computing resources for processing host read requests, host write requests, and/or garbage collection tasks.

The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions from one or more of the hosts 104 and take an action such as reading, writing, or otherwise accessing the requested data. These data transactions may include host read requests to read data from the storage system 102 and/or host write requests to write data to the storage system 102. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes at least one processor such as a microcontroller or a central processing unit (CPU) operable to perform various computing instructions that are stored in at least one memory. The instructions may, when executed by one or more processors, cause the one or more processors to perform various operations described herein with the storage controllers 108.a, 108.b in the storage system 102 in connection with examples of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 for storing data and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some examples, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.*a*, 108.*b* in communication with the storage devices 106 and any respective caches. The storage controllers 108.*a*, 108.*b* exercise low-level control over the storage devices 106 in order to execute (perform) data transactions on behalf of one or more of the hosts 104. The storage controllers 108.*a*, 108.*b* are illustrative only; more or fewer may be used in various examples. Having at least two storage controllers 108.*a*, 108.*b* may be useful, for example, for failover purposes in the event of equipment failure of either one. The storage system 102 may also be communicatively coupled to a user display for displaying diagnostic information, application output, and/or other suitable data.

In the present example, storage controllers 108.*a* and 108.*b* are arranged as a high availability pair. Thus, when storage controller 108.*a* performs a write operation for a host 104, storage controller 108.*a* may also sends a mirroring I/O operation to storage controller 108.*b*. Similarly, when storage controller 108.*b* performs a write operation, it may also send a mirroring I/O request to storage controller 108.*a*. Each of the storage controllers 108.*a* and 108.*b* has at least one processor executing logic to process host read requests, host write requests, and garbage collection tasks according to examples of the present disclosure.

Moreover, the storage system 102 may be communicatively coupled to a server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size. In an example, the server 114 may also provide data transactions to the storage system 102, and in that sense may be referred to as a host 104 as well. The server 114 may have a management role and be used to configure various aspects of the storage system 102 as desired, for example under the direction and input of a user. Some configuration aspects may include definition of RAID group(s), disk pool(s), and volume(s), to name just a few examples. These configuration actions described with respect to server 114 may, alternatively, be carried out by any one or more of the other devices identified as hosts 104 in FIG. 1 without departing from the scope of the present disclosure.

With respect to the hosts 104, a host 104 includes any computing resource that is operable to exchange data with storage system 102 by providing (initiating) data transactions to the storage system 102, such as by providing host read requests and host write requests to the storage system 102. In an exemplary example, a host 104 includes a host bus adapter (HBA) 110 in communication with a storage controller 108.*a*, 108.*b* of the storage system 102. The HBA 110 provides an interface for communicating with the storage controller 108.*a*, 108.*b*, and in that regard, may conform to any suitable hardware and/or software protocol. In various examples, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many examples, a host 104 may have multiple communicative links with a single storage system 102 for redundancy. The multiple links may be provided by a single HBA 110 or multiple HBAs 110 within the hosts 104. In some examples, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

According to examples of the present disclosure, the storage controllers 108.*a* and 108.*b* may maintain a priority ordering that is used to prioritize decompression of data corresponding to host read requests over compressing data included in host write requests and performing processing corresponding to garbage collection tasks. Moreover, the storage controllers 108.*a* and 108.*b* may allocate host write requests to be processed using inline techniques when computing resources are determined to exceed a threshold and switch to background processing techniques for the host write requests when computing resources are determined to be below the threshold.

With respect to garbage collection corresponding to already stored data, the storage controllers 108.*a* and 108.*b* may allocate processing between compressing data received in host write requests and garbage collection tasks based on available resources and age of the data. For example, the storage controllers 108.*a* and 108.*b* may prioritize compression of data stored on the storage system 102 and received from hosts 104 according to a determined age (from oldest to youngest) and/or determined frequency of modification (from infrequently modified to more frequently modified). Allocation of processing tasks according to a priority ordering is discussed in more detail with respect to FIG. 2 and FIG. 3, below.

Figure 2:
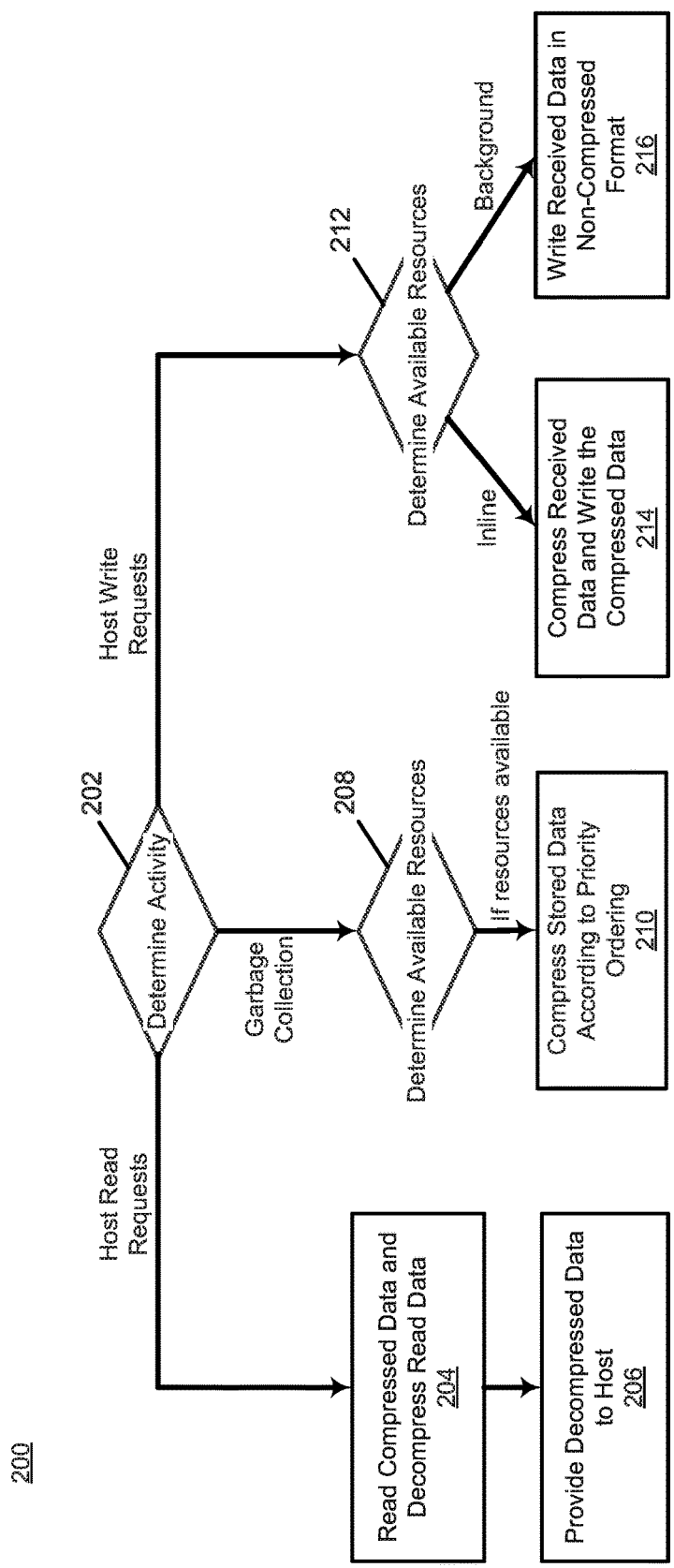
FIG. 2 is a flow diagram of a method for dynamically allocating processing for host read requests, host write requests, and garbage collection according to aspects of the present disclosure.

FIG. 2 is a flow diagram of a method 200 for dynamically allocating processing for host read requests, host write requests, and garbage collection according to aspects of the present disclosure. In an example, the method 200 may be implemented by one or more processors of one or more of the storage controllers 108 of the storage system 102, executing computer-readable instructions from one or more computer-readable media to perform the functions described herein. In the description of FIG. 2, reference is made to a storage controller (e.g., storage controller 108.*a* and/or 108.*b*) for simplicity of illustration, and it is understood that other storage controller(s) may be configured to perform the same functions when performing a processing task. It is understood that additional steps can be provided before, during, and after the steps of method 200, and that some of the steps described can be replaced or eliminated for other examples of the method 200.

At block 202, the storage controller determines an activity to perform. For example, the storage controller may receive one or more host read requests, one or more host write requests, and/or determine that one or more garbage collection tasks should be performed. Accordingly, the storage controller processes any pending host read requests in block 204, any pending garbage collection tasks in block 208, and any pending host write requests in block 212. The processing may be performed in parallel or sequentially. For example, at any given time there may be multiple active host read requests, host write requests, and garbage collection processes being executed by one or more processors.

At block 204, responsive to receiving one or more host read requests, the storage controller processes the one or more host read requests to access the data requested in the one or more host read requests by the one or more hosts. The storage controller locates the data requested by the one or more hosts in memory, retrieves the data in a compressed format from the memory, and decompresses the data. Compressed data may include data that is compressed according to one or more compression algorithms, such as Lempel-Ziv-Oberhumer (LZO) compression. De-duplication may also be applied to the data instead of or in addition to compression according to a same prioritization scheme. Examples of decompressing the compressed data include performing a decompression algorithm on the compressed data to restore the data to a non-compressed and/or duplicated format. In the present example, decompression of compressed data corresponding to received host read requests is given priority over other determined activities, such as performing garbage collection and compressing data received in host write requests. That is, when there are insufficient computing resources available, garbage collection and compression corresponding to host write requests may be delayed and/or skipped so that computing resources are made available for decompressing data responsive to the host read requests.

At block 206, the storage controller provides the decompressed data to the requesting hosts. After providing the decompressed data, the storage controller may continue processing one or more other received host read requests or return to block 202 to determine another activity to perform.

At block 208, the storage controller determines available resources for performing garbage collection. The determining of available resources may include determining processor usage, memory bandwidth, drive utilization, channel utilization, I/O (input and/or output) latency, and/or I/O profile metrics. For example, the storage controller may identify an amount of computing resources that are available after taking into account the processing of host read requests, host write requests, garbage collection tasks, and/or other processing activities. In some examples, the determining the available resources may include determining the maximum system load capabilities of the storage system (e.g., CPU processor utilization, memory bandwidth, drive utilization, channel utilization, I/O (input and/or output) latency, and/or I/O profile metrics) and determining the difference between this maximum system load and the current system load. The current system load may include the load on the CPU, such as measured by the processor usage and/or memory bandwidth to name just a few examples.

In some examples, the storage controller performs one or more garbage collection tasks responsive to determining that an amount of resources available exceeds a threshold. For example, the storage controller may periodically determine the available resources such that garbage collection tasks may be allocated for processing during times when there are greater computing resources available (such as when the current system load decreases below a threshold relative to the maximum system load).

At block 210, when the storage controller determines that the available resources are sufficient for performing garbage collection, the storage controller allocates resources for one or more garbage collection tasks to compress data stored in the storage system according to a priority ordering. Otherwise, garbage collection operations may be performed without compressing data. In some examples, if there are not sufficient resources available for performing garbage collection, the garbage collection tasks may be delayed for a later time. Accordingly, a rate of garbage collection may be determined based on a determined amount of additional capacity that is requested by the storage controller. Moreover, the amount of compression performed during the garbage collection may be adjusted based on available computing resources (e.g., based on CPU processor utilization, memory bandwidth, drive utilization, channel utilization, I/O (input and/or output) latency, and/or I/O profile metrics).

In the present example, the compressing of the data includes reading non-compressed data from the storage system and performing compression techniques on the data to reduce the memory footprint of the data that is stored in the memory. De-duplication may also be applied to the data instead of or in addition to compression. The storage controller then writes this compressed data to the storage system, and the compressed data replaces the previously stored non-compressed data. Accordingly, the compression results in greater memory and/or storage capacity availability due to the stored compressed data occupying less memory and/or storage capacity than it previously occupied in the non-compressed format.

In some examples, during the processing of a garbage collection task, the priority ordering is applied to compress data stored in the storage system according to a determined age (from oldest to youngest) and/or a determined frequency of modification (from infrequently modified to more frequently modified). The storage controller may determine age by identifying a most recent modification time corresponding to the data. The storage controller may determine frequency by identifying an amount of times the blocks of data have been modified over a preconfigured time period.

Age and/or frequency of modification may also be determined by identifying modification times corresponding to other data stored in a same area of memory as the data and amount of times the other data is modified. Accordingly, the storage controller may predict the stability and/or frequency of modification corresponding to the data received in host write requests based on determining age and/or frequency corresponding to other data stored in locations proximate to or in a same area as the data. With respect to data that was written to memory in a non-compressed format (for example, as described in action 216), the storage controller reads the non-compressed data from memory, compresses the data, and writes the compressed data to memory to replace the non-compressed data previously stored in the memory. Accordingly, the memory footprint of the stored data is reduced. The data may also be processed by de-duplication techniques instead of or in addition to performing the compression techniques.

After compressing the data, the storage controller may continue processing one or more other garbage collection tasks or return to block 202 to determine another activity to perform.

At block 212, responsive to receiving one or more host write requests, the storage controller determines available resources for processing the one or more host write requests. Similar to the determining of available resources in block 208, the determining of available resources at block 212 may include determining available computing resources, such as by measuring the current system load and identifying available resources based on a difference between the current system load and the maximum system load. Determining the available resources may include identifying an amount of processor and memory related resources that are available after taking into account the processing of host read requests, host write requests, garbage collection tasks, and/or other processing activities.

Accordingly, by determining the available resources as discussed above, the storage controller may dynamically allocate processing of the host write requests between inline processing and background processing based on the amount of resources available. In more detail, when the available resources exceed a threshold, the host write requests may be processed via inline compression processing as described in block 214. When the available resources are below the threshold, host write requests may be processed via background compression processing as described in block 216. In some examples, the threshold may be set by estimating an amount of resources to process the host write requests using inline processing, and comparing the estimates with the amount of available computing resources. If the estimated amount of resource to perform inline processing of the host write requests exceeds the available computing resources, the storage controller may perform background processing of the host write requests. In other examples, thresholds may be user-configured based on processor utilization and/or memory bandwidth percentages or dynamically determined by the storage controller based on analysis of historical data.

At block 214, if the storage controller determines that the amount of the available resources exceeds a threshold, the storage controller processes the received one or more host write requests using an inline compression technique. The inline compression technique may include having the storage controller compress all of the data that the hosts are requesting to write to storage. The storage controller may compress this data as it is received, such that the data is written to storage in a compressed format in an initial pass. The compressed data is then maintained in the storage in the compressed format, such that later host read requests to access the data will cause the storage controller to decompress the data to provide the data to the hosts. In the present example, the compressing of the data includes performing compression techniques on the data included in the host write requests that reduce the memory footprint of the received data that is stored in the memory. The data may also be processed by de-duplication techniques instead of or in addition to performing the compression techniques. Accordingly, the compression results in the stored compressed data occupying less memory than it would have occupied if stored in a non-compressed format.

At block 216, if the storage controller determines that the amount of the available resources is below the threshold, the storage controller writes the data included in the host write requests to the memory of the storage system using a background processing technique. The background processing technique may include writing the data to storage in a non-compressed format during a first pass. For example, the data may be written without first processing the data with a compression algorithm to reduce the memory footprint of the data. In other examples, the data may be compressed using a compression algorithm that has a lower overhead. The lower overhead compression algorithm may be less effective, but may also allow for at least some compression of the data to be performed, which may be an improvement from storing the data in a non-compressed format. Thus, the storage controller may conserve processor resources and memory bandwidth by not compressing the data or by compressing the data using a lower overhead compression algorithm as the data is received in the host write requests. At a later time (e.g., during garbage collection in block 210), when the storage controller determines that there are sufficient available resources, the storage controller may then compress the data that was originally stored during the first pass in a non-compressed format or compressed using a lower overhead compression algorithm.

After storing the data included in the host write requests in a non-compressed format (or lower overhead compression format), the storage controller later may identify that there are available resources for compressing the data. Accordingly, at the later time, the storage controller may compress the non-compressed data in action 210 during the performance of garbage collection. For example, when the available computing resources exceed a threshold, the storage controller may determine to compress the data stored in the non-compressed format. Accordingly, the storage controller reads the non-compressed data from memory and compresses the non-compressed data read from memory according to a priority ordering, as described in action 210. After processing the host write requests, the storage controller may continue processing one or more other host write requests or return to block 202 to determine another activity to perform.

Figure 3:
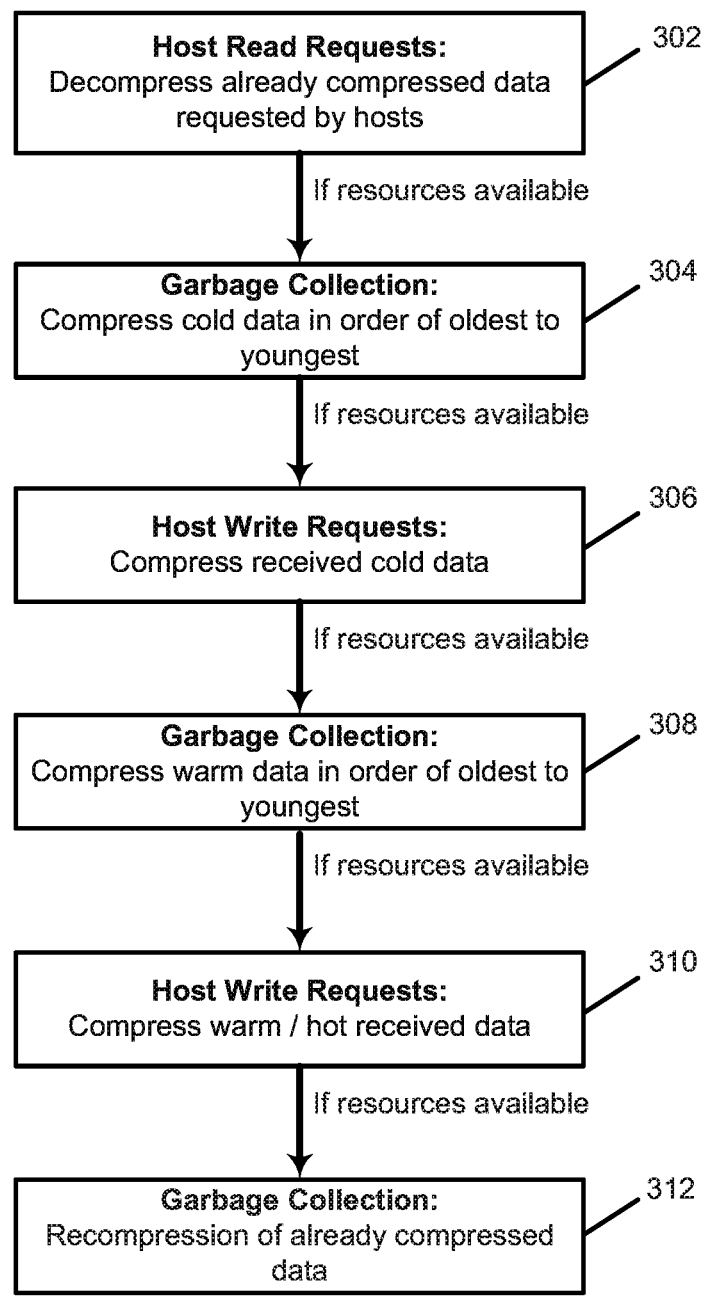
FIG. 3 illustrates an exemplary data compression priority ordering according to aspects of the present disclosure.

FIG. 3 illustrates an exemplary data compression priority ordering 300 which may be implemented with respect to host read requests, host write requests, and/or garbage collection according to aspects of the present disclosure. In an example, the priority ordering 300 may be implemented by one or more processors of one or more of the storage controllers 108 of the storage system 102, executing computer-readable instructions from one or more computer-readable media to perform the functions described herein. Moreover, the priority ordering may be applied in the method 200 (for example in step 210) to prioritize particular garbage collection and/or host write request tasks over other garbage collection and/or host write request tasks. It is understood that additional priorities can be provided before, during, and after the priorities provided in the priority ordering 300, and that some of the priorities described can be replaced or eliminated for other examples of the priority ordering 300.

In the present example, the priorities assigned to processing tasks are provided in a decreasing priority ordering from highest priority at block 302 to lowest priority in block 312.

At the highest priority in block 302, a storage controller assigns computing resources to host read requests to decompress already compressed data that is requests by the hosts. The storage controller reads the compressed data from memory, decompresses the compressed data, and provides the decompressed data to the hosts.

At the second highest priority in block 304, computing resources that are available after processing the host read requests at block 302 may be allocated by the storage controller for performing garbage collection of cold data to compress the cold data in a non-compressed format. Cold data may generally refer to data that has an age that is greater than a user configured or determined threshold. For example, the controller may determine the threshold based on activity. In the present example, the compression of the cold data is performed in an ordering that takes into account the age of the cold data. The storage controller may measure the age of the data by the last modification time of the data, which indicates an amount of time since the data has been last modified. Generally, compressing older cold data (that has been modified prior to other cold data) is preferable to compressing younger cold data. Accordingly, the storage controller compresses the cold data in an order based on the determined age information corresponding to the cold data such that the older cold data is compressed prior to compressing younger cold data. The storage controller then writes the compressed data to the memory.

At the third highest priority block 306, computing resources that are available after processing the garbage collection tasks at block 304 may be allocated by the storage controller for compressing received cold data included in host write requests. The data included in the host write requests may be determined to be cold based on determining a location in memory where the data is to be stored, and determining an age of the data in that location of the memory. Accordingly, if the storage controller determines that the data in that area of the memory has an age that is greater than a user configured threshold, the storage controller may determine that the data is cold. The storage controller compresses the received cold data and writes the cold data to the memory.

At the fourth highest priority block 308, computing resources that are available after processing the cold data included in the host write requests at block 306 may be allocated by the storage controller for performing garbage collection of warm data to compress the warm data in a non-compressed format. As described above, cold data may be data that has an age that is above a user defined threshold. Thus, warm data may be data that has an age that is below the user defined threshold. Accordingly, the storage controller performs the compression in an order based on the determined age information corresponding to the warm data such that the older warm data is compressed prior to compressing younger warm data. The storage controller then writes the compressed data to memory.

At the fifth highest priority block 310, computing resources that are available after processing the garbage collection tasks at block 308 may be allocated by the storage controller for compressing all received data included in host write requests. For example, inline processing may be applied to the host write requests such that any data, whether cold, warm, and/or hot data is compressed and stored to memory. The storage controller may determine that the data included in the host write requests is warm or hot based on determining a location in memory where the data is to be stored, and determining an age of the data in that location of the memory. Accordingly, if data in that area of the memory is determined to have an age that is lower than a user configured threshold, the data may be determined to be warm. If the data has an age that is lower than a second user configured threshold, the data may be determined to be hot. In some examples, cold data is data that is older than warm data, and warm data is older than hot data. Thus, the hot data may include data that is predicted to be overwritten shortly. The storage controller writes the compressed warm or hot data to memory.

At the lowest priority block 312, computing resources that are available after processing the warm or hot data included in the host write requests at block 310 may be allocated by the storage controller for performing garbage collection corresponding to already compressed data in memory. For example, a second compression algorithm may be determined to be more effective than a previous compression algorithm that was used to compress the data. Effectiveness may be measured, for example, by the amount that the compression algorithm is able to reduce the memory footprint of the data. Accordingly, the storage controller may read the already compressed data from the memory, decompress the compressed data, and re-compress the decompressed data using the second compression algorithm that is more effective than the first compression algorithm. In some examples, the second compression algorithm may not have been available at the time the data was compressed by the first compression algorithm. In other examples, the first compression algorithm may be determined to require fewer computing resources, and the storage controller may have selected the first compression algorithm over the second compression algorithm at the initial pass based on a determined amount of available computing resources being below a threshold.

As a result of the elements discussed above, examples of the present disclosure improve upon storage system technology. For example, a storage system's performance is improved by addressing issues relating to limited computing resources, such that processing is allocated in an efficient manner. Thus, relatively important tasks, such as decompressing data corresponding to host read requests may be prioritized over relatively less important compression tasks during times of low computing resource availability. The storage system is also able to maintain high compression ratios by allocating compression tasks corresponding to garbage collection and host write requests to times when computing resources are available. Accordingly, the techniques described herein provide for both maintaining availability of computing resources for processing host read requests while at the same time maintaining high compression ratios. Moreover, such priority-based techniques may allow for reducing storage component resource requirements at peak times by spreading the performance of compression tasks over time.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    determining, by a storage controller, an amount of available computing resources of the storage controller while decompressing data for a host read request and providing the decompressed data to a requesting host;
    performing, by the storage controller based on the amount of available computing resources exceeding a threshold, inline compression of a first portion of host write requests, wherein an amount of the host write requests included in the first portion is increased while the amount of available computer resources exceeds the threshold;
    performing, by the storage controller based on the amount of available computing resources being below the threshold, background compression of a second portion of the host write requests, wherein an amount of the host write requests included in the second portion is increased while the amount of available computer resources is below the threshold; and
    prioritizing, by the storage controller, compression of stored data corresponding to the background compression according to a priority ordering that takes into account an age of the stored data.

2. The method of claim 1, wherein the performing inline compression further comprises: compressing, by the storage controller, data corresponding to the first portion of host write requests as the data is received.

3. The method of claim 1, wherein the performing background compression further comprises:
    storing, by the storage controller, data corresponding to the second portion of the host write requests in a non-compressed format for compression at a later time.

4. The method of claim 1, wherein the performing background compression further comprises:
    storing data corresponding to the second portion of the host write requests in a first compressed format for compression to a second compressed format at a later time, wherein the second compressed format corresponds to a higher compression overhead than the first compressed format.

5. The method of claim 1, wherein the prioritizing compression further comprises:
    prioritizing the stored data based on a last modification time of the stored data, in an order from oldest to youngest.

6. The method of claim 1, wherein the prioritizing compression further comprises:
    prioritizing the stored data based on an expected frequency of modification of the stored data, in an order from least frequently modified to most frequently modified.

7. The method of claim 1, wherein determining an amount of available computing resources comprises determining processor usage, memory bandwidth, drive utilization, and I/O latency.

8. A non-transitory machine readable medium having stored thereon instructions for performing a method comprising machine executable code which when executed by at least one machine, causes the at least one machine to:
    determine an amount of available computing resources of the machine while decompressing data for a host read request and provide the decompressed data to a requesting host;
    perform, based on the amount of available computing resources being above a threshold, inline compression of a first portion of host write requests, wherein an amount of the host write requests included in the first portion is increased while the amount of available computer resources exceeds the threshold;
    perform, based on the amount of available computing resources being below the threshold, background compression of a second portion of the host write requests, wherein an amount of the host write requests included in the second portion is increased while the amount of available computer resources is below the threshold; and
    prioritize compression of stored data corresponding to the background compression according to a priority ordering that takes into account an age of the stored data.

9. The non-transitory machine readable medium of claim 8, wherein performing the inline compression further comprises instructions which, when executed by the at least one machine, causes the machine to:
    compress data corresponding to the first portion of host write requests as the data is received.

10. The non-transitory machine readable medium of claim 8, wherein performing the background compression further comprises instructions which, when executed by the at least one machine, causes the machine to:
    store data corresponding to the second portion of the host write requests in a non-compressed format for compression at a later time.

11. The non-transitory machine readable medium of claim 8, wherein performing the background compression further comprises instructions which, when executed by the at least one machine, causes the machine to:
    store data corresponding to the second portion of the host write requests in a first compressed format for compression to a second compressed format at a later time, wherein the second compressed format corresponds to a higher compression overhead than the first compressed format.

12. The non-transitory machine readable medium of claim 8, wherein prioritizing the compression further comprises instructions which, when executed by the at least one machine, causes the machine to:
  prioritize the stored data based on a last modification time of the stored data, in an order from oldest to youngest.

13. The non-transitory machine readable medium of claim 8, wherein prioritizing the compression further comprises instructions which, when executed by the at least one machine, causes the machine to:
  prioritize the stored data based on an expected frequency, in an order from least frequently modified to most frequently modified.

14. The non-transitory machine readable medium of claim 8, wherein determining the amount of available computing resources further comprises instructions which, when executed by the at least one machine, causes the machine to:
  determine processor usage, memory bandwidth, drive utilization, and I/O latency.

15. A computing device comprising:
  at least one memory containing machine readable medium comprising machine executable code having stored thereon instructions for performing a method of dynamically adjusting compression rates during input/output (I/O) operation; and
  at least one processor coupled to the at least one memory, the at least one processor configured to execute the machine executable code to cause the at least one processor to:
    determine an amount of available computing resources of the computing device while decompressing data for a host read request and provide the decompressed data to a requesting host;
    perform, based on the amount of available computing resources being above a threshold, inline compression of a first portion of host write requests, wherein an amount of the host write requests included in the first portion is increased while the amount of available computer resources exceeds the threshold;
    perform, based on the amount of available computing resources being below the threshold, background compression of a second portion of the host write requests, wherein an amount of the host write requests included in the second portion is increased based while the amount of available computer resources is below the threshold; and
    prioritize compression of stored data corresponding to the background compression according to a priority ordering that takes into account an age of the stored data.

16. The computing device of claim 15, wherein the processor, in performing the inline compression, is further configured to execute the machine executable code to cause the at least one processor to:
  compress data corresponding to the first portion of host write requests as the data is received.

17. The computing device of claim 15, wherein the processor, in performing the background compression, is further configured to execute the machine executable code to cause the at least one processor to:
  store data corresponding to the second portion of the host write requests in a non-compressed format for compression at a later time.

18. The computing device of claim 15, wherein the processor, in performing the background compression, is further configured to execute the machine executable code to cause the at least one processor to:
  store data corresponding to the second portion of the host write requests in a first compressed format for compression a second compressed format at a later time, wherein the second compressed format corresponds to a higher compression overhead than the first compressed format.

19. The computing device of claim 15, wherein the processor, in prioritizing the compression, is further configured to execute the machine executable code to cause the at least one processor to:
  prioritize the stored data based on a last modification time of the stored data, in an order from oldest to youngest.

20. The computing device of claim 15, wherein the processor, in prioritizing the compression, is further configured to execute the machine executable code to cause the at least one processor to:
  prioritize the stored data based on an expected frequency of modification of the stored data, in an order from least frequently modified to most frequently modified.

* * * * *